(12) United States Patent
Steele et al.

(10) Patent No.: US 10,812,522 B2
(45) Date of Patent: *Oct. 20, 2020

(54) SYSTEM FOR INFORMATION SECURITY THREAT ASSESSMENT

(71) Applicant: Bank of America Corporation, Charlotte, NC (US)

(72) Inventors: David Michael Steele, Carollton, TX (US); Nelson John Chevis, Sr., Highland Village, TX (US); Jason Dean Vaughn, Jacksonville, FL (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/708,805

(22) Filed: Dec. 10, 2019

(65) Prior Publication Data

US 2020/0120129 A1 Apr. 16, 2020

Related U.S. Application Data

(63) Continuation of application No. 15/826,893, filed on Nov. 30, 2017, now Pat. No. 10,616,260.

(51) Int. Cl.
*H04L 29/06* (2006.01)
(52) U.S. Cl.
CPC ...... *H04L 63/1433* (2013.01); *H04L 63/1441* (2013.01)
(58) Field of Classification Search
CPC ............ H04W 12/0027; H04W 12/08; H04W 12/00503; H04W 12/06; H04W 12/12; H04W 12/02; H04W 12/10; H04W 12/1208; H04W 12/00403; H04W 76/12; H04W 12/00505; H04W 12/0609; H04W 12/0806; H04W 12/1202; H04W 12/1204;
(Continued)

(56) References Cited

U.S. PATENT DOCUMENTS 8,353,045 B2 1/2013 Karabey et al.
8,392,431 B1 3/2013 Agassy et al.
(Continued)

OTHER PUBLICATIONS

Google Scholar search results in U.S. Appl. No. 15/826,893, System for Information Security Threat Assessment, 2 pages; Nov. 8, 2019.
(Continued)

*Primary Examiner* — Abiy Getachew
(74) *Attorney, Agent, or Firm* — Michael A. Springs; Moore & Van Allen PLLC; Seongun M. Hong

(57) ABSTRACT

The invention utilizes a two-component system to detect third party security threats and drive internal system processes based on the detection. The first component of the system is a threat level engine, which collects external and internal system data on a real-time basis to determine changes in conditions that may give rise to a security threat. Based on the external and internal data, the level engine may calculate a threat assessment level to determine the level of the threat. The second component of the system is a third party analytics engine, which may comprise a machine learning component which is configured to detect threat patterns and anomalies, which may in turn be used to trigger events or to drive internal system processes.

20 Claims, 3 Drawing Sheets

(58) Field of Classification Search
CPC ..... H04W 4/60; G06Q 30/0185; G06Q 10/00;
G06Q 10/10; G06Q 50/265; G06Q 20/02;
G06Q 20/06; G06Q 20/12; G06Q
20/1235; G06Q 20/24; G06Q 20/382;
G06Q 30/06; G06Q 10/0833; G06Q
50/01; G06Q 50/24; G06Q 20/10; G06Q
50/22; G07F 9/026; H04N 21/2347;
H04N 21/2541; H04N 21/26613; H04N
21/4405; H04N 21/4623; H04N 21/4627;
H04N 21/8355; G16H 10/60; G16H
40/20; G16H 40/63; G16H 50/70; Y10S
707/957; Y10S 707/959; G06T 1/20;
G09G 5/363; Y02D 10/13; Y02P 90/84;
H04L 63/1433; H04L 63/1441; H04L
63/1425; H04L 63/1416; H04L 63/1408;
H04L 67/06; H04L 2463/142; H04L
2463/144; H04L 29/06877; H04L 41/069;
H04L 63/0227; H04L 63/14; H04L
63/145; H04L 63/1458; H04L 63/1466;
H04L 63/1483; H04L 67/30; H04L
9/0869; H04L 9/3228
See application file for complete search history.

(56) References Cited

U.S. PATENT DOCUMENTS

| | | | |
|---|---|---|---|
| 8,402,546 B2 | 3/2013 | Greenshpon et al. | |
| 8,418,249 B1 * | 4/2013 | Nucci | G06F 21/552 706/20 |
| 8,438,644 B2 | 5/2013 | Watters et al. | |
| 8,516,594 B2 | 8/2013 | Bennett et al. | |
| 8,725,597 B2 | 5/2014 | Mauseth et al. | |
| 8,744,894 B2 | 6/2014 | Christiansen et al. | |
| 8,752,170 B1 | 6/2014 | Newstadt et al. | |
| 9,130,937 B1 | 9/2015 | Ostermann et al. | |
| 9,230,066 B1 | 1/2016 | Bailey et al. | |
| 9,275,291 B2 | 3/2016 | Shulman et al. | |
| 9,282,092 B1 | 3/2016 | Shankar et al. | |
| 9,319,419 B2 | 4/2016 | Sprague et al. | |
| 9,578,043 B2 | 2/2017 | Mawji et al. | |
| 9,679,254 B1 | 6/2017 | Mawji et al. | |
| 9,699,209 B2 | 7/2017 | Ng et al. | |
| 9,721,296 B1 | 8/2017 | Chrapko | |
| 10,491,627 B1 | 11/2019 | Su | |
| 2004/0044912 A1 | 3/2004 | Connary et al. | |
| 2005/0154601 A1 | 7/2005 | Halpern et al. | |
| 2009/0024663 A1 * | 1/2009 | McGovern | G06F 21/577 |
| 2009/0123023 A1 * | 5/2009 | Hein, III | H04N 21/8358 382/100 |
| 2009/0178139 A1 * | 7/2009 | Stute | G06Q 10/109 726/22 |
| 2013/0179761 A1 | 7/2013 | Cho et al. | |
| 2014/0357318 A1 | 12/2014 | Li | |
| 2015/0264077 A1 * | 9/2015 | Berger | H04L 63/1441 726/23 |
| 2016/0173524 A1 | 6/2016 | Lietz et al. | |
| 2016/0371698 A1 | 12/2016 | Adler et al. | |
| 2017/0063888 A1 | 3/2017 | Muddu et al. | |
| 2017/0140312 A1 | 5/2017 | Pai et al. | |
| 2017/0223032 A1 | 8/2017 | El-Moussa et al. | |
| 2017/0272472 A1 | 9/2017 | Adhar | |
| 2017/0310708 A1 | 10/2017 | Schiappa et al. | |
| 2017/0339172 A1 | 11/2017 | Mahadevia et al. | |
| 2017/0359370 A1 * | 12/2017 | Humphries | H04L 63/10 |
| 2018/0084000 A1 | 3/2018 | Baukes et al. | |
| 2018/0089449 A1 | 3/2018 | Boudreau et al. | |
| 2018/0103055 A1 | 4/2018 | Kechane et al. | |
| 2018/0375877 A1 | 12/2018 | Jakobsson et al. | |
| 2019/0066042 A1 | 2/2019 | Conlon | |
| 2019/0081983 A1 | 3/2019 | Teal | |
| 2019/0173909 A1 | 6/2019 | Mixer et al. | |
| 2019/0260794 A1 | 8/2019 | Woodford et al. | |

OTHER PUBLICATIONS

STIC search results in U.S. Appl. No. 15/826,893, InnovationQ Plus IP.com, 1 page; Nov. 8, 2019.

* cited by examiner

SYSTEM FOR INFORMATION SECURITY THREAT ASSESSMENT

CROSS-REFERENCE TO RELATED APPLICATION

This application is a continuation of and claims priority from allowed, co-pending U.S. patent application Ser. No. 15/826,893, filed on Nov. 30, 2017 and entitled "SYSTEM FOR INFORMATION SECURITY THREAT ASSESSMENT".

FIELD OF THE INVENTION

The present invention embraces a system, computer program product, and computer-implemented method for detecting and analyzing information security threat assessment stemming from third party systems.

BACKGROUND

In the information security context, an entity may commonly rely on third party servers and applications to run its various systems. As a result, security issues and vulnerabilities which compromise the third party servers and applications may in turn create a security threat to the entity's systems. Accordingly, there is a need for a way to efficiently and effectively identify third party security threats.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The invention utilizes a two-component system to detect third party security threats and drive internal system processes based on the detection. The first component of the system is a threat level engine, which collects external and internal system data on a real-time basis to determine changes in conditions that may give rise to a security threat. Based on the external and internal data, the level engine may calculate a threat assessment level to determine the level of the threat. The second component of the system is a third party analytics engine, which may comprise a machine learning component which is configured to detect threat patterns and anomalies, which may in turn be used to trigger events or to drive internal system processes.

Accordingly, embodiments of the present invention provide a system, computer program product, and computer-implemented method for determining security threat levels in order to drive internal system processes. The invention comprises retrieving, from an entity database server, internal security threat data associated with a third party application; retrieving, from a third party computing system, external security threat data associated with the third party application; calculating, via a threat level engine, a security threat level of the third party application based on the internal security threat data and the external security threat data; determining, using the security threat level of the third party application, that the third party application represents a security threat; and based on determining that the third party application represents a security threat, executing security resolution steps to mitigate the security threat.

In some embodiments, the invention further comprises sending, to a user, an alert comprising the security threat level and recommendation, wherein the recommendation comprises a link to execute a first action; receiving an indication that the user has selected the link to execute the first action; and executing the first action, wherein the first action comprises initiating a reassessment of the third party application.

In some embodiments, the invention further comprises detecting that a device is currently utilizing the third party application; and automatically blocking the device from accessing the third party application.

In some embodiments, determining that the third party application represents a security threat comprises detecting that the security threat level has risen above a threshold security threat level.

In some embodiments, the internal security threat data comprises historical data, the historical data comprising threat incident data and threat vector data.

In some embodiments, the third party computing system hosts a threat intelligence feed.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
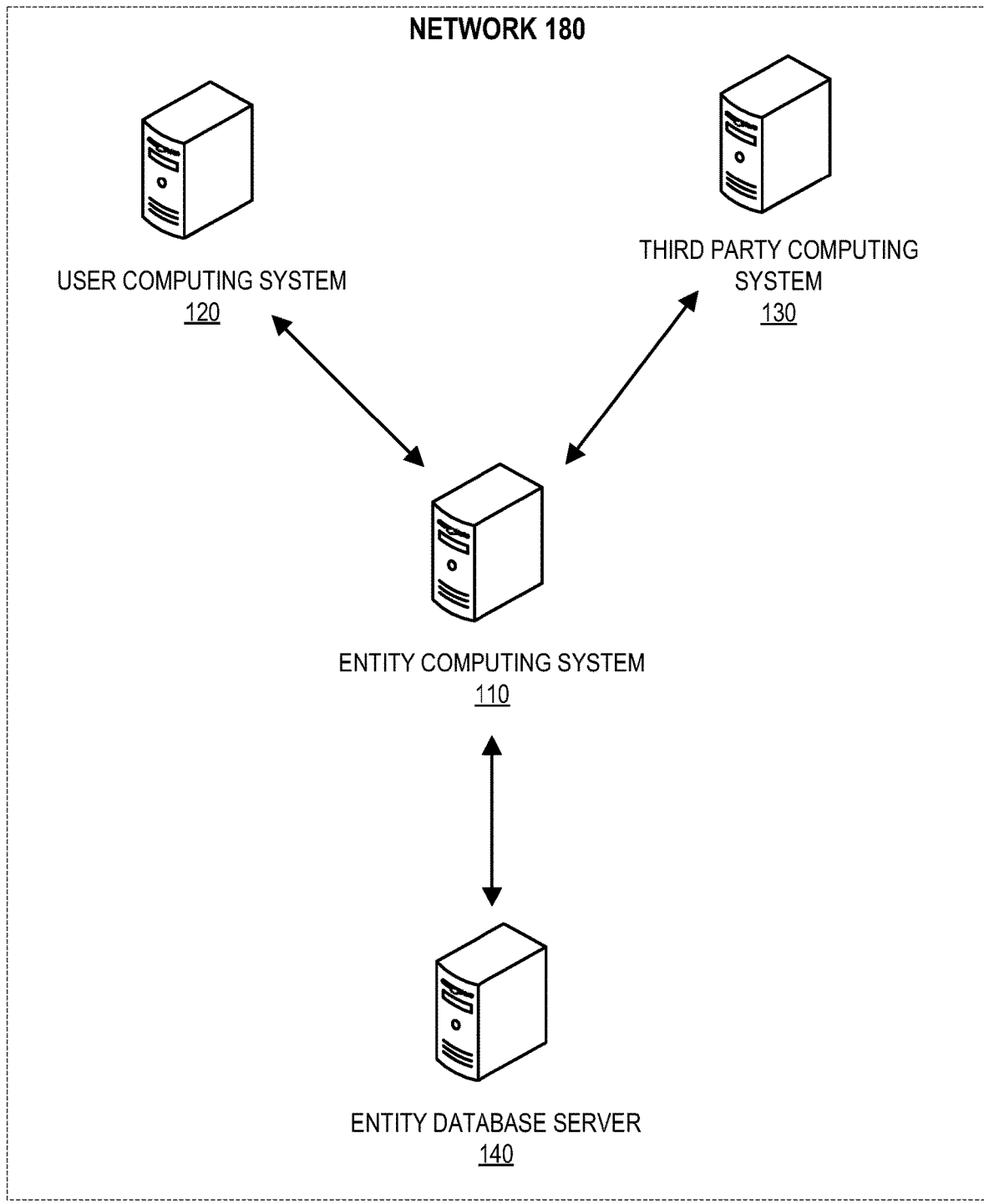
Figure 2:
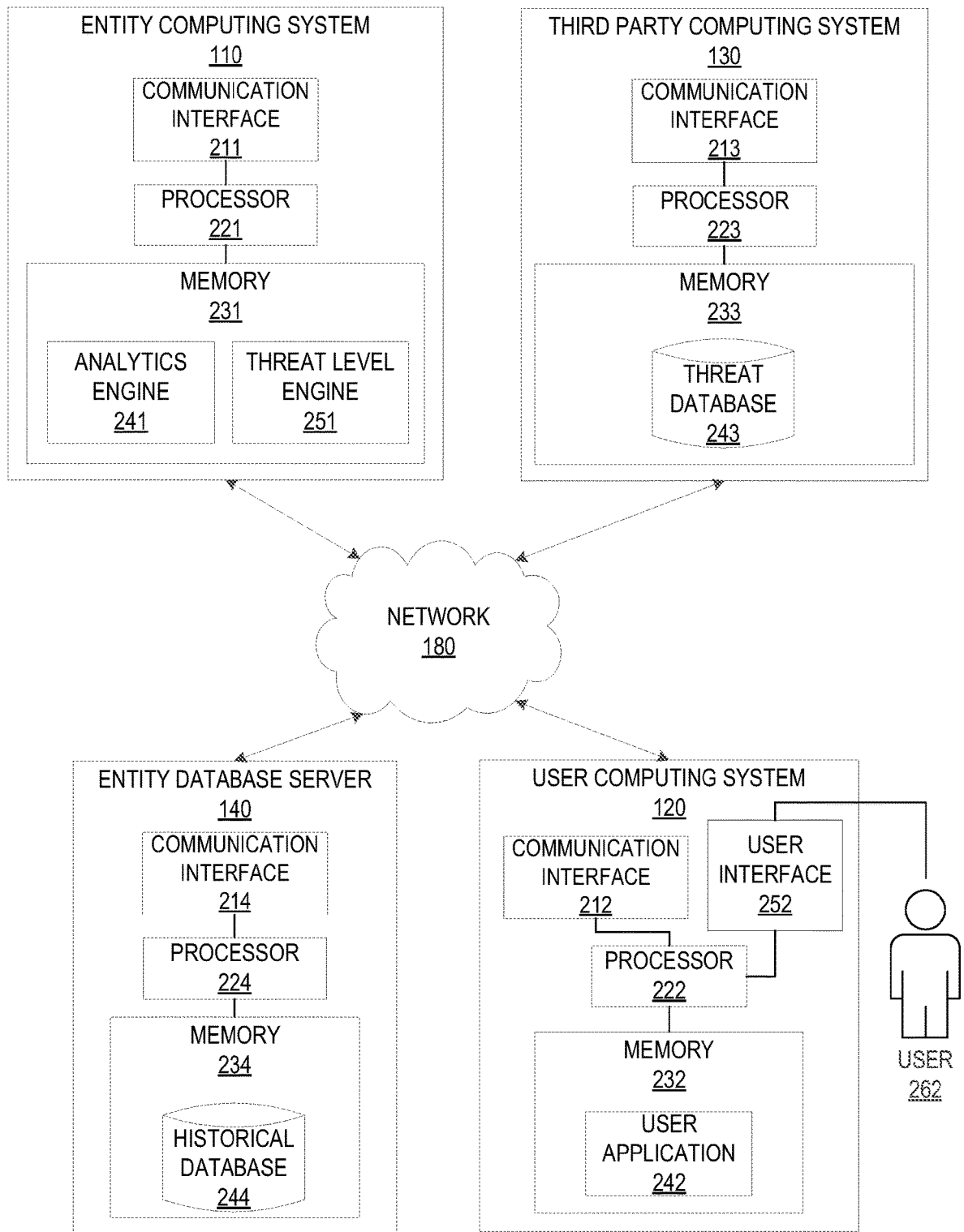
Figure 3:
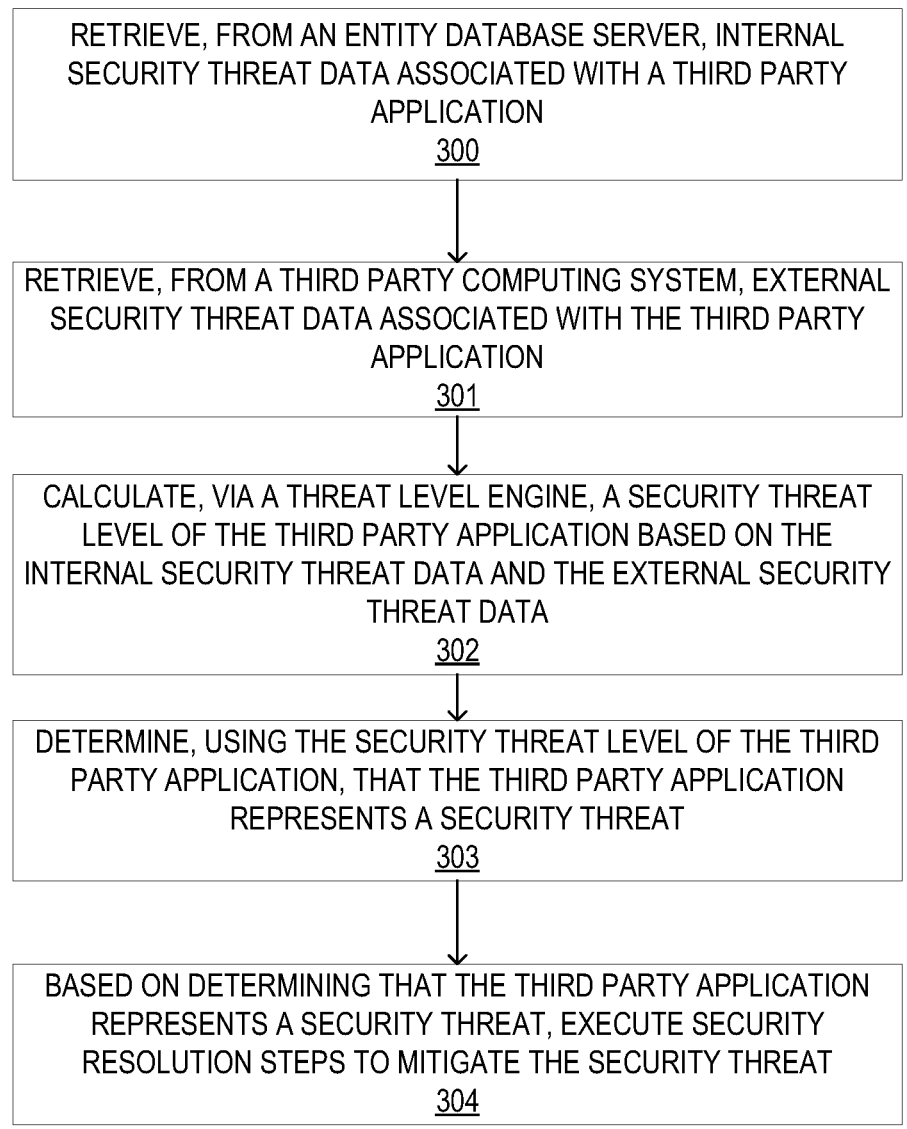

Having thus described embodiments of the invention in general terms, reference will now be made to the accompanying drawings, wherein:

FIG. 1 is a block diagram illustrating an operating environment for the information security threat assessment system, in accordance with one embodiment of the present invention;

FIG. 2 is a block diagram illustrating the entity computing system, the user computing system, the third party computing system, and the entity database server in more detail, in accordance with one embodiment of the present invention; and FIG. 3 is a process flow illustrating the use of the security threat levels calculated by the threat level engine to drive internal system processes, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates a system of networked computing devices and/or systems on which the security threat assessment system implemented. The entity may be a business organization, a non-profit organization, a government organization, and the like.

"User" as used herein may refer to an individual who may log onto the system to view and/or manage the functioning of the threat assessment system. Typically, the user is authorized by the entity to access the system. Accordingly, in some embodiments, the user may be an employee of the entity such as an administrator.

"Computing system" as used herein may refer to a networked computing device within the entity system. The computing system may include a processor, a non-transitory storage medium, a communications device, and a display. The computing system may support user logins and inputs from any combination of similar or disparate devices. Accordingly, the computing system may be a portable electronic device such as a smartphone, tablet, or laptop, or the computing may be a stationary unit such as a personal desktop computer or networked terminal within an entity's premises. In some embodiments, the computing system may be a local or remote server which is configured to send and/or receive inputs from other computing systems on the network.

"Resource" as used herein may refer to an object which is typically transferred between the third party and the entity. The object may be tangible or intangible objects such as computing resources, data files, documents, funds, and the like.

"Security threat" as used herein may refer to the existence of a potential impact to the entity's systems caused by third parties. For instance, a security threat issue may compromise the security of a third party application that is being used by an entity. In other embodiments, the security threat may be a diminished capacity of the third party to provide resources to the entity. In some embodiments, said resource may be, for example, computing resources such as processing power, networking bandwidth, cloud storage space, and the like. In other embodiments, the resource may be funds.

Embodiments of the present invention provide a system, computer program product, and method for detecting and analyzing information security threat assessment stemming from third party systems. In particular, the system may comprise a threat level engine and a third party analytics engine to identify, assess, and resolve security issues that may arise from an entity's association with third party applications and services. For example, an entity may store some of its data on a cloud storage server hosted by a third party. The threat level engine may be configured to gather data relating to security issues that may be affecting a third party. The threat level engine may pull data from external sources (i.e. open source intelligence), such as public databases, threat intelligence feeds, and the like. The threat level engine may further pull data from internal sources, such as historical data, incident data, assessment findings, previously run analyses, and the like. The threat level engine may, by receive external data and internal data as inputs and thereafter output a numerical threat assessment value which reflects the threat posed by the third party security issue. The system may then be better positioned to drive internal system processes based on the threat assessment value generated.

Typically, the threat level engine validates internal findings of application security impact using external data sources. For instance, the threat level engine may detect that a cloud storage service has been affected by an application vulnerability that may compromise the security of the entity's data stored on the cloud storage systems. In some embodiments, the application vulnerability may correspond to a weak encryption method. The threat level engine may validate this internal finding (i.e. that the third party systems use a weak encryption method) by scraping data from external sources. My correlating internal data to external data, the threat level engine may generate a level that accurately reflects the threat level of the application vulnerability. The threat level engine may further be configured to continuously monitor internal and external data sources for changes to the various conditions that may contribute to a third party threat level and store the extracted data in a historical data. By collecting historical data in this way, the threat level engine allows the system to more efficiently adapt to new security threats.

The third party analytics engine may comprise a machine learning capability to analyze the data collected through the threat level engine. Specifically, the third party analytics engine may be configured to detect patterns and correlations within both the internal data and the external data collected by the threat level engine, such as outliers or anomalies. For instance, the third party analytics engine may, based on historical data, initially determine that the encryption used by a third party application is adequately secure for the entity's purposes. The third party analytics engine may continually monitor both the internal and external data to constantly reassess the adequacy of the third party application's encryption level. Thereafter, the third party analytics engine may detect an anomaly in the security of the third party application's encryption level. For instance, the third party analytics engine may detect from the external data that a new encryption standard is not being used by the third party application, or that the current encryption standard is subject to a security issue. The third party analytics engine may further detect from internal data that the authentication certificates are no longer genuine, or that the third party application was the source of a data leak of the entity's information. Upon making such a determination, the third party analytics engine may drive a response to the anomaly, such as a comparison of internal and external data to determine the extent of the security threat or the impact to the entity's confidential data. In some embodiments, the third party analytics engine may be configured to constantly monitor threat assessment levels for the various third parties associated with the entity. Upon detecting a drop in the threat assessment level that rises above a set threshold, the third party analytics engine may trigger an automated alert to notify the entity of the drop in the level as well as the relevant data needed to assess the reasons for the drop in the level. The threshold may be manually configured by the entity's administrators, or automatically determined by the third party analytics engine.

Utilizing the threat level engine in tandem with the third party analytics engine addresses a number of issues with current analytics technology. In particular, the system offers a way for an entity to efficiently and effectively address third party security threats in a timely manner, which greatly increases the security of the data stored on the entity's further. Furthermore, the correlation of the internal and external data allows the system to reduce the number of false positives and/or negatives, which in turn helps reduce the amount of computing resources needed to correct the error. Such computing resources may include processing power, memory space, storage space, cache space, electric power, and networking bandwidth.

FIG. 1 is a block diagram illustrating an operating environment for the information security threat assessment system, in accordance with one embodiment of the present invention. The operating environment may include an entity computing system 110 in operative communication with a user computing system 120, a third party computing system 130, and an entity database server 140 over a network 180. The network 180 may also be a global area network (GAN), such as the Internet, a wide area network (WAN), a local area network (LAN), or any other type of network or combination of networks. The network 180 may provide for wireline, wireless, or a combination wireline and wireless communication between devices on the network 180. It should be understood by those having ordinary skill in the art that although the entity computing system 110, the user computing system 120, the third party computing system 130, and the entity database server 140 are depicted as single units, each of the depicted computing systems may represent multiple computing systems. In some embodiments, a given computing system as depicted in FIG. 1 may represent multiple systems configured to operate in a distributed fashion. For instance, the entity computing system 110 may represent a plurality of computing systems which exists within the entity's networks. In other embodiments, the depictions in FIG. 1 may represent multiple disparate computing systems. For instance, the third party computing system 130 may represent multiple third party computing systems 130 owned and operated by a number of different third parties.

The user computing system 100 is typically a device that may be operated by a user, where the device may be a mobile device such as a smartphone, tablet, or laptop, a personal computing device such as a desktop computer, smart device, single board computer, or a device owned and operated by an entity, such as a computer system terminal located on the entity's premises. In some embodiments, the user is an employee of the entity such as a systems administrator who is authorized to configure the threat level engine and the third party analytics engine. The user may further be authorized to access the data extracted by the threat level engine and stored within the threat database.

Typically, the entity computing system 101 stores the executable code for the threat level engine and the third party analytics engine. Accordingly, the entity computing system 101 may be configured to access the third party computing system 130 to pull data through the threat level engine. Typically, data pulled from the third party computing system 130 may be referred to as "external" data. Said external data may include, for example, third party security threat assessment data from publicly available servers, such as threat intelligence feeds.

The entity computing system 101 may further be configured to access the entity database server 140, which may store historical data regarding the various third parties associated with the entity. Such data pulled from the entity database server 140 may be referred to as "internal" data. Said internal data may include data relating to security threats associated with third parties from the perspective of the entity, such as internal security assessments, recorded application vulnerabilities, historical incident data, and the like. In this way, the entity computing system 101 may utilize a security threat algorithm to correlate internal data associated with a particular third party with external data associated with the third party to calculate a threat assessment level for the third party. In some embodiments, the system may calculate an individual threat assessment level for each application or service provided by the third party. For instance, the system may calculate separate levels for a third party's cloud storage services and the third party's web hosting services. The threat assessment level may be calculated based on a set range between a minimum and maximum value, such as 0-100. Typically, a higher level represents a greater security threat, while a lower level represents a lower security threat. In some embodiments, the system may be configured to assign a higher weight to internal data (e.g. internal data indicating possible security threats will add a greater value to the threat assessment level than external data indicating possible security threats). The security threat algorithm may further take into account the frequency with which the security threat is encountered as well as the potential damage that may be caused by the security threat. For instance, a threat assessment level for a cloud data storage provider may be higher based on a high number of security breaches over a period of time and/or the amount or sensitivity of the entity's data stored on the cloud storage.

The entity computing system 101 may further use the threat assessment level calculated by the threat level engine to drive internal system processes with respect to the third parties. In an exemplary embodiment, a third party may be a business entity which provides a service to the entity. The entity computing system 101 may pull internal data from the entity database server which indicates that a payment platform utilized by the third party has been compromised and is no longer secure. The entity computing system 101 may pull external data from open source intelligence sources to validate the findings of the internal data. Based on the weight of the internal data and external data, the entity computing system 101 may generate a threat assessment level. For example, repeated security breaches of the payment system of the third party will be indicated in the internal data, and will thus tend to create a high threat assessment level. External indications that the payment system has indeed been compromised (e.g. threat intelligence feeds) will further add to the threat assessment level. Based on the value of the threat assessment level, the system may be configured to take a number of different actions. For instance, if the threat assessment level rises above a certain threshold, the system may be configured to automatically block the use of the payment system on a system-wide basis within the entity. In another embodiment, the third party may be a cloud data storage provider which has suffered a data security breach. Upon detecting that the threat assessment level for the third party has risen above a certain threshold, the system may automatically stop the computing devices within the entity from uploading any additional data to the cloud storage hosted by that particular third party.

The third party analytics engine may comprise a machine learning component which analyzes the internal data, external data, and threat assessment levels to determine correlations between data sets and identify emerging patterns in the data. Such correlations and pattern detections may be used to further refine the security threat algorithm to produce a more precise and/or accurate security threat level. The entity computing system 100 may further continuously monitor third party security threats on a real-time basis. Upon detecting a potential security threat caused by a third party, the system may automatically generate a security threat event alert and push the alert to a user computing system 100. The alert may comprise the calculated security threat level as well as a breakdown of the implicated third party systems. For instance, the third party analytics engine may detect that a third party offering a plurality of services (e.g. cloud data hosting, payment processing, web hosting) has suffered a system-wide security breach. Each service offered by the third party may be affected to varying degrees from the security breach. Accordingly, the threat level engine may calculate individual security threat levels for each service. Once an aggregate threat level of the security breach crosses a certain threshold, the system may generate an alert containing the security threat levels for each service and send the alert to the user.

Typically, user computing systems 100 are used to log onto the entity computing system 101 over the network 180 to access the entity computing system 101 to access the data generated and stored by the threat level engine and/or the third party analytics engine. The entity computing system 101 may require that authentication credentials are provided by the user computing system 100 in order to access the data therein. In some embodiments, the authentication credentials may include a username, password, a biometric identifier, a cryptographic key, a token, and the like. The system may further require that more than one authentication credential is provided as parts of a multi-step authentication process.

The entity computing system 101 may, upon authenticating the user computing system 100, be configured to display aggregated security threat data related to all third parties associated with the entity, in addition to individual security threat data related to particular third parties. For example, the system may display to the user a graph of the top 20 third parties associated with the entity that pose the greatest security threat to the entity. The system may further be configured, based on the calculated security threat levels, to dynamically provide recommendations via the third party analytics engine. For instance, the third party analytics engine may detect that a particular third party (e.g. a web server host) falls within the top 20 third parties posing the greatest security threat. The third party analytics engine may assess the services offered by the particular third party and propose alternate courses of action to mitigate the security threat. For example, the third party analytics engine may propose the utilization of a competing third party service provider with a lower calculated security threat level. The recommendation may be pushed to the user via a notification on the user computing system 100, where the notification may contain an interactive option allowing the user to select the recommendation. Once the user selects the recommendation, the system may dynamically execute the actions needed to mitigate the security threat level posed by the third party in question.

FIG. 2 is a block diagram illustrating the entity computing system 110, the user computing system 120, the third party computing system 130, and the entity database server 140 in more detail, in accordance with one embodiment of the present invention. The entity computing system 110 typically contains a processor 221 communicably coupled to such devices as a communication interface 211 and a memory 231. The processor 221, and other processors described herein, typically includes circuitry for implementing communication and/or logic functions of the entity computing system 110. For example, the processor 221 may include a digital signal processor device, a microprocessor device, and various analog to digital converters, digital to analog converters, and/or other support circuits.

The entity computing system 110 may use the communication interface 211 to communicate with other devices over the network 180. The communication interface 211 as used herein may include an Ethernet interface, an antenna coupled to a transceiver configured to operate on a cellular data or WiFi signal, and/or a near field communication ("NFC") interface.

The entity computing system 110 may include a memory 231 operatively coupled to the processor 221. As used herein, memory includes any computer readable medium (as defined herein below) configured to store data, code, or other information. The memory may include volatile memory, such as volatile Random Access Memory (RAM) including a cache area for the temporary storage of data. The memory may also include non-volatile memory, which can be embedded and/or may be removable. The non-volatile memory can additionally or alternatively include an electrically erasable programmable read-only memory (EEPROM), flash memory or the like. The memory 231 within the entity computing system 110 may comprise the analytics engine 241 and the threat level engine 251. When used in conjunction with one another, the analytics engine 241 and the threat level engine 251 aggregates security threat data associated with third parties, generates a security threat level from internal and external data, and assesses and correlates the data by pattern detection.

The third party computing system 130 may comprise a communication interface 213, a processor 223, and a memory 233. In some embodiments, the third party computing system 130 may be owned and operated by a third party entity which gathers security threat data regarding other third parties. In such embodiments, the memory 233 may comprise a threat database 243. Typically, the threat database 243 contains the data gathered by a third party concerning other third parties. For instance, the data within the threat database 243 may include recorded events of security breaches of a particular third party application, known security issues, or other indicators of third party instability. The data within the threat database 243 may be referred to by the system as the "external data" used by the threat level engine 251 to calculate the security threat level. In other embodiments, the third party computing system 130 may be a computing device which stores an application utilized by the entity. In such embodiments, the entity computing system 110 may use various methods to assess the security level of the third party application. In some embodiments, this may include internal assessments, in which the entity evaluates the third party systems for security measures such as data loss prevention (DLP) controls, segregation of network channels, authentication measures and/or certificates, and the like.

The entity database server 140 may comprise a communication interface 214, a processor 224, and a memory 234 having an historical database 244 stored thereon. It should be appreciated that the historical database 244 may also exist as a single logical database distributed amongst a plurality of computing systems. The historical database 244 may comprise the "internal data" collected by the entity regarding the various third parties with which the entity associates. Typically, the entity may continuously collect data on the third parties for inclusion into the historical database 244. Such data may include internal assessment data, application vulnerability scans, security threat incident data, threat vector data, and the like. The data may further include the magnitude of the third party security threat to the entity, such as the rate of utilization of the third party application, the number of systems on which the third party application is installed, the amount of sensitive data stored on the third party systems, and the like. Such internal data may serve as inputs into the security threat detection algorithm, which the threat level engine may use to calculate the security threat level.

The user computing system 120 typically includes a processor 222 operatively coupled to a communication interface 212 and a memory 232. The memory 232 may contain a user application 242 which causes the processor 222 to display a user interface 252 to a user 262. The user interface 252 may comprise the hardware and software implements necessary to accept input from and provide output to the user. Accordingly, the user interface 252 may comprise hardware such as a display, audio output devices, projectors, and the like, or input devices such as keyboards, mice, motion sensors, cameras, biometric sensors, and the like. The user interface 252 may further comprise software such as a graphical or command-line interface through which the user may provide inputs and/or receive outputs from the user computing system 120. It should be understood that the display on which the user interface 252 is presented may include an integrated display (e.g. a tablet or smartphone screen) within the user computing system 120, or an external display device (e.g. a computer monitor or television). The user application 242 within the memory 232 may be a client application to allow the user 262 to access the security threat level data stored on the entity database server 140 configure the threat level engine 251 and/or the analytics engine 241. In other embodiments, the application within the memory 232 may be a general purpose application such as a web browser. The application, upon receiving input from the user 262, causes the processor 222 to, through the communication interface 212, establish a communication link to the communication interfaces of the entity database server 140, the entity computing system 110, and/or the third party computing system 130.

The user application 242 may, by displaying a graphical interface, allow the user 262 to configure threat level engine 251 and/or the analytics engine 241. For instance, the graphical interface may allow the user 262 to tweak the weighting of the internal and external data used by the threat level engine to calculate the security threat level. This allows the user 262 to adjust threat levels according to the entity's ongoing needs. For example, a new data encryption standard may necessitate putting a higher weight on data encryption methods used by third party applications.

In some embodiments, the user application 242 may further be configured to, through the graphical interface, allow the user to access the data within the historical database 244 and/or the threat database 243. In particular, the user 262 may be authorized to access the security threat level data generated by the threat level engine 251. The graphical interface may be configured to display security threat level data in various formats to the user 262, such as graphs, tables, charts, maps, and the like. In this way, the system provides the user 262 a way to efficiently assess the frequency and severity of security threats of various third parties and their applications. The graphical interface may further be configured to display correlations recognized by the analytics engine 241 as well as recommendations to the user 262 based on emergent patterns. For instance, the analytics engine 241 may detect that a particular third party application has allowed authentication certificates to expire on multiple occasions in the past. The analytics engine 241 may, based on the security threat level calculated by the threat level engine as well as the potential harm that may be caused to the entity as a result of the security threat, recommend that the entity cease the use of the third party application. In some embodiments, the system may be configured to display an alert or notification on the display of the user computing system 120, where the alert or notification contains a description of the recommendation and an option to implement the recommendation. The system may, upon receiving a selection of the option by the user, execute the steps necessary to implement the recommendation. The recommendation may be, for instance, an activation of a lock on the third party application from computing devices within the entity's system. In some embodiments, the system may, upon detecting that a security threat level has passed a certain threshold, automatically execute steps to mitigate the potential impact. For example, the system may determine that the encryption methods a cloud data storage services have been compromised. In such an instance, the system may automatically implement a systems-wide lockdown of the third party application such that the computing devices within the entity's systems are prevented from uploading further data to the third party application.

FIG. 3 is a process flow illustrating the use of the security threat levels calculated by the threat level engine to drive internal system processes, in accordance with one embodiment of the present invention. The process begins at block 300, where the system retrieves, from an entity database server, internal security threat data associated with a third party application. The internal security threat data typically comprises information gathered by the entity on third party services and applications utilized by the entity. For instance, the internal security threat data may include application vulnerability findings of the application, which are conducted to assess the potential security issues within third party applications. Such security issues may include expired authentication credentials or certificates, outdated data encryption methods, or other data security policies. The internal security threat data may further comprise internal assessments, which may include snapshots of notes and opinions recorded about the third party applications by the users and/or employees within the entity's systems.

The process continues to block 301, where the system retrieves, from a third party computing system, external security threat data associated with the third party application. The external security threat data may typically be found on public databases, threat intelligence feeds, and the like. The external security threat data may include data such as security ratings, benchmarks, and assessments collected by a third party with respect to other third party applications. In some embodiments, the third party computing system may require the entity's system to authenticate itself in order to access the external security threat data, such as when the data is available only on a subscription basis. In such embodiments, the entity's system may be required to provide authentication credentials, such as a username and password, secure token, cryptographic key, and the like. In other embodiments, the external security threat data may be publicly accessible.

The process continues to block 302, where the system calculates, via a threat level engine, a security threat level of the third party application based on the internal security threat data and the external security threat data. Typically, the threat level engine will input the internal security threat data along with the external security threat data into a security threat detection algorithm to generate a security threat level for the third party application. The security threat detection algorithm may place a greater weight on the internal security threat data compared to the external security threat data. In such embodiments, the internal security threat data will be the main factor in determining the security threat level, while the external security threat data will be used to validate the internal security threat data. The calculated security threat level may have a discrete value, which may typically range from 0 to 100, with a level of 0 indicating that the third party application poses no chance of security threat to the entity (i.e. there is a 0% chance of a security threat caused by the third party application), while a level of 100 indicates that the third party application will certainly pose a security threat to the entity (i.e. there is a 100% chance of a security threat caused by the third party application). The security threat detection algorithm may account for various other factors when calculating the security threat level. For instance, the security threat level may represent the level of vulnerability of the entity's systems to a particular security threat, based on application scans or findings, such as a finding that a third party application uses an outdated encryption method. The security threat level may further represent the frequency with which the security threat is detected. For instance, the security threat level may reflect that a third party application frequently uses expired certificates. The security threat level may further take into account historical data reflecting the number of times that the entity has suffered a detriment due to the security threat, such as data loss or leak of sensitive data. The security threat level may further account for the magnitude of the detriment. By also taking into account historical data, the security threat detection algorithm becomes increasingly accurate over time as more historical data is collected, which in turn allows the system to effectively and accurately determine the security threat level posed by any of the third party applications utilized by the entity.

The process continues to block 303, where the system determines, using the security threat level of the third party application, that the third party application represents a security threat. Typically, the system makes this determination based on the security threat level crossing a set threshold for the third party application. In some embodiments, the system may assign a global security threat threshold (e.g. 90) which will apply to all applications. In some embodiments, the system may assign individual thresholds to each third party application according to potential impact. For instance, a third party cloud storage provider which hosts particularly sensitive data belonging to the entity may be assigned a lower security threat threshold (i.e. a remediation response will be triggered on a more strict basis in order to prevent sensitive data loss). On the other hand, other third party applications may be assigned a relatively higher security threat threshold in the event that the third party offers ancillary services or do not host sensitive data. In this way, the system may balance the efficient allocation of system resources while maximizing efforts to mitigate the greatest security threats.

The process concludes at block 304, where the system, based on determining that the third party application represents a security threat, executes security resolution steps to mitigate the security threat. The entity may take a number of different security resolution steps to remediate the security threat. For instance, the security resolution steps may comprise sending an alert to an administrator within the entity upon calculating that the security threat level has passed a certain threshold. In this way, the system is able to notify administrators on a real-time basis of security threats to the entity. This is especially important with respect to time-sensitive security threats, such as when the entity must immediately act to protect its data in the event of a breach. The alert may comprise a recommendation to take an action based on the security threat level. For instance, the system may recommend a reassessment of the third party application, a deep scan of security threats posed by the third party application, and the like. The system may further be configured to take certain actions automatically to mitigate the security threat. For instance, the system may be configured to identify the devices within the entity's systems are currently using the third party application and automatically block access to certain third party applications that are known to have been compromised, such as by unauthorized access and/or malicious code. In this way, damage to the entity systems may be prevented on an immediate, real-time basis, thus greatly enhancing the security of the computing systems within the entity.

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| U.S. patent application Ser. No. | Title | Filed On |
| --- | --- | --- |
| 15/827,094 published as U.S. Patent Publication No. 2019/0166154 | SYSTEM FOR INFORMATION SECURITY THREAT ASSESSMENT BASED ON DATA HISTORY | Nov. 30, 2017 |
| 15/827,292 published as U.S. Patent Publication No. 2019/0166155 | SYSTEM FOR GENERATING A COMMUNICATION PATHWAY FOR THIRD PARTY VULNERABILITY MANAGEMENT | Nov. 30, 2017 |
| 15/826,979 published as U.S. Patent Publication No. 2019/0166153 | INFORMATION SECURITY VULNERABILITY ASSESSMENT SYSTEM | Nov. 30, 2017 |
| 15/827,515 published as U.S. Patent Publication No. 2019/0163916 | DATA INTEGRATION SYSTEM FOR TRIGGERING ANALYSIS OF CONNECTION OSCILLATIONS | Nov. 30, 2017 |
| 15/827,034 published as U.S. Patent Publication No. 2019/0163914 | SYSTEM FOR INFORMATION SECURITY THREAT ASSESSMENT AND EVENT TRIGGERING | Nov. 30, 2017 |
| 15/827,097 published as U.S. Patent Publication No. 2019/0163915 | SYSTEM FOR RECURRING INFORMATION SECURITY THREAT ASSESSMENT | Nov. 30, 2017 |

What is claimed is:

1. A system for determining security threat levels in order to drive internal system processes, comprising:
an entity computing system comprising:
 a processor;
 a communication interface; and
 a memory having a threat level engine stored therein, wherein the threat level engine, when executed by the processor, causes the processor to:
  calculate, via a threat level engine, a security threat level of a third party application based on security threat data associated with the third party application;
  determine, using the security threat level of the third party application, that the third party application represents a security threat; and
  based on determining that the third party application represents a security threat, execute security resolution steps to mitigate the security threat, wherein executing the security resolution steps comprises:
   sending, to a user, an alert comprising the security threat level and recommendation, wherein the recommendation comprises a link to execute a first action;

receiving an indication that the user has selected the link to execute the first action; and executing the first action, wherein the first action comprises initiating a reassessment of the third party application.

2. The system according to claim 1, wherein executing security resolution steps comprises the threat level engine further causing the processor to:

detect that a device is currently utilizing the third party application; and automatically block the device from accessing the third party application.

3. The system according to claim 1, wherein determining that the third party application represents a security threat comprises detecting that the security threat level has risen above a threshold security threat level.

4. The system according to claim 1, wherein the security threat data associated with the third party application comprises internal security threat data retrieved from an internal database server.

5. The system according to claim 4, wherein the internal security threat data comprises historical data, the historical data comprising threat incident data and threat vector data.

6. The system according to claim 1, wherein the security threat data associated with the third party application comprises external security threat data retrieved from a third party computing system.

7. The system according to claim 6, wherein the third party computing system hosts a threat intelligence feed.

8. A computer program product for determining security threat levels in order to drive internal system processes, the computer program product comprising at least one non-transitory computer readable medium having computer-readable program code portions embodied therein, the computer-readable program code portions comprising:

an executable portion for calculating, via a threat level engine, a security threat level of a third party application based on security threat data associated with the third party application;

an executable portion for determining, using the security threat level of the third party application, that the third party application represents a security threat; and an executable portion for, based on determining that the third party application represents a security threat, executing security resolution steps to mitigate the security threat;

an executable portion for sending, to a user, an alert comprising the security threat level and recommendation, wherein the recommendation comprises a link to execute a first action;

an executable portion for receiving an indication that the user has selected the link to execute the first action; and an executable portion for executing the first action, wherein the first action comprises initiating a reassessment of the third party application.

9. The computer program product according to claim 8, the computer-readable program code portions further comprising:

an executable portion for detecting that a device is currently utilizing the third party application; and an executable portion for automatically blocking the device from accessing the third party application.

10. The computer program product according to claim 8, wherein determining that the third party application represents a security threat comprises detecting that the security threat level has risen above a threshold security threat level.

11. The computer program product according to claim 8, wherein the security threat data associated with the third party application comprises internal security threat data retrieved from an internal database server and external security threat data retrieved from a third party computing system.

12. The computer program product according to claim 11, wherein the internal security threat data comprises historical data, the historical data comprising threat incident data and threat vector data.

13. The computer program product according to claim 11, wherein the third party computing system hosts a threat intelligence feed.

14. A computer-implemented method for determining security threat levels in order to drive internal system processes, said method comprising:

calculating, via a threat level engine, a security threat level of a third party application based on security threat data associated with a third party application;

determining, using the security threat level of the third party application, that the third party application represents a security threat; and based on determining that the third party application represents a security threat, executing security resolution steps to mitigate the security threat;

sending, to a user, an alert comprising the security threat level and recommendation, wherein the recommendation comprises a link to execute a first action;

receiving an indication that the user has selected the link to execute the first action; and executing the first action, wherein the first action comprises initiating a reassessment of the third party application.

15. The computer-implemented method according to claim 14, the method further comprising:

detecting that a device is currently utilizing the third party application; and automatically blocking the device from accessing the third party application..

16. The computer-implemented method according to claim 14, wherein determining that the third party application represents a security threat comprises detecting that the security threat level has risen above a threshold security threat level.

17. The computer-implemented method according to claim 14, wherein the security threat data associated with the third party application comprises internal security threat data retrieved from an internal database server.

18. The computer-implemented method according to claim 17, wherein the internal security threat data comprises historical data, the historical data comprising threat incident data and threat vector data.

19. The computer-implemented method according to claim 14, wherein the security threat data associated with the third party application comprises external security threat data retrieved from a third party computing system.

20. The computer-implemented method according to claim 19, wherein the third party computing system hosts a threat intelligence feed.

* * * * *